US010827505B2

(12) United States Patent
You et al.

(10) Patent No.: US 10,827,505 B2
(45) Date of Patent: *Nov. 3, 2020

(54) METHOD FOR RECEIVING DOWNLINK CONTROL CHANNEL BY MTC DEVICE, AND TERMINAL

(71) Applicant: LG Electronics Inc., Seoul (KR)

(72) Inventors: Hyangsun You, Seoul (KR); Suckchel Yang, Seoul (KR); Yunjung Yi, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 37 days.

This patent is subject to a terminal disclaimer.

(21) Appl. No.: 16/195,298

(22) Filed: Nov. 19, 2018

(65) Prior Publication Data

US 2019/0090248 A1 Mar. 21, 2019

Related U.S. Application Data

(63) Continuation of application No. 15/120,490, filed as application No. PCT/KR2015/002263 on Mar. 10, 2015, now Pat. No. 10,171,931.

(Continued)

(51) Int. Cl.
*H04W 72/04* (2009.01)
*H04L 5/00* (2006.01)
(Continued)

(52) U.S. Cl.
CPC ......... *H04W 72/0486* (2013.01); *H04L 5/003* (2013.01); *H04L 5/0053* (2013.01);
(Continued)

(58) Field of Classification Search
CPC ..... H04L 5/0032; H04L 5/0053; H04L 5/003; H04W 72/042; H04W 72/04
See application file for complete search history.

(56) References Cited

U.S. PATENT DOCUMENTS 9,357,543 B2 * 5/2016 Yi .................. H04B 7/2656
2011/0286406 A1 * 11/2011 Chen ............... H04L 1/1861
370/329

(Continued)

FOREIGN PATENT DOCUMENTS

KR 1020110010682 A 7/2011
KR 10-1289261 B1 7/2013
(Continued)

OTHER PUBLICATIONS

Alcatel-Lucent et al., "Consideration on Low Cost MTC UE," 3GPP Draft; R1-135153, Nov. 13, 2013, see sections 1-3.

(Continued)

*Primary Examiner* — Raj Jain
(74) *Attorney, Agent, or Firm* — Dentons US LLP

(57) ABSTRACT

An embodiment of the present specification provides a method for receiving a downlink control channel by a machine type communication (MTC) device. The method comprises: a step of receiving, by the downlink control channel, setting information about the maximum number of physical resource blocks (PRBs) which can be transmitted by a base station; a step of receiving, by the MTC device, setting information about a set of control channel monitoring PRBs which should monitor the downlink control channel; and a step of monitoring the downlink control channel on the PRBs according to the setting information about the set of control channel monitoring PRBs, wherein if the number of sets of control channel monitoring PRBs exceeds the maximum number of PRBs, the downlink control channel may be monitored only on the sets of PRBs equal to or less than the maximum number of PRBs.

10 Claims, 15 Drawing Sheets

Related U.S. Application Data

(60) Provisional application No. 61/954,622, filed on Mar. 18, 2014.

(51) Int. Cl.
  *H04W 4/70* (2018.01)
  *H04W 88/02* (2009.01)
  *H04W 88/08* (2009.01)

(52) U.S. Cl.
  CPC ............. *H04W 4/70* (2018.02); *H04W 72/04* (2013.01); *H04W 72/042* (2013.01); *H04W 88/02* (2013.01); *H04W 88/08* (2013.01)

(56) References Cited

U.S. PATENT DOCUMENTS

| | | | | |
|---|---|---|---|---|
| 2013/0044712 | A1* | 2/2013 | Kim | H04L 5/0053 370/329 |
| 2013/0083753 | A1 | 4/2013 | Lee et al. | |
| 2013/0163543 | A1* | 6/2013 | Freda | H04W 16/14 370/329 |
| 2014/0071918 | A1 | 3/2014 | Park et al. | |
| 2015/0016310 | A1* | 1/2015 | Yi | H04B 7/2615 370/277 |
| 2015/0103800 | A1* | 4/2015 | Seo | H04W 48/10 370/330 |
| 2017/0013390 | A1* | 1/2017 | You | H04W 72/0486 |
| 2019/0158234 | A1* | 5/2019 | Seo | H04L 5/001 |

FOREIGN PATENT DOCUMENTS

| | | |
|---|---|---|
| KR | 20140031120 A | 3/2014 |
| WO | 2014019216 | 2/2014 |

OTHER PUBLICATIONS

Sharp, "Further consideration on the reduced PDSCH frequency allocation for low-cost UE," 3GPP Draft; R1-135341, Nov. 13, 2013, see sections 1-3.

Catt, "Downlink bandwidth reduction for new category/type UEs," 3GPP Draft, R1-140073, Feb. 9, 2014, see sections 1-3.

Interdigital, "Specification impacts of cost-reduction techniques for low cost UE," 3GPP Draft, R1-133176, Aug. 10, 2013, see sections 1-4.

* cited by examiner

METHOD FOR RECEIVING DOWNLINK CONTROL CHANNEL BY MTC DEVICE, AND TERMINAL

This application is a continuation of U.S. patent application Ser. No. 15/120,490, filed Aug. 19, 2016, which is a National Stage Application of International Application No. PCT/KR2015/002263, filed Mar. 10, 2015 and claims the benefit of U.S. Provisional Application No. 61/954,622, filed Mar. 18, 2014, all of which are incorporated by reference in their entirety herein.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, it is recently suggested to restrict a bandwidth for a downlink channel for low-cost or low-complexity MTC devices.

In this case, the MTC devices may have difficulty in receiving a downlink channel on a restricted bandwidth.

SUMMARY OF THE INVENTION

Accordingly, the disclosure of the specification has been made in an effort to solve the problem.

To achieve the foregoing aspect, a method according to the disclosure of the present specification is a method for a machine-type communication (MTC) device to receive a downlink control channel, the method including: receiving configuration information on a maximum number of physical resource blocks (PRBs) which are available for a base station to transmit the downlink control channel; receiving configuration information on a set of PRBs for monitoring control channel in which the MTC device needs to monitor the downlink control channel; and monitoring the downlink control channel on the PRBs according to the configuration information on the set of PRBs for monitoring control channel, wherein when a number of the PRBs based on the set of PRBs for monitoring control channel exceeds the maximum number of PRBs, the downlink control channel may be monitored only on a set of a number of PRBs equal to or less than the maximum number of PRBs.

Here, the maximum number of PRBs for the downlink control channel may be 6.

Further, the downlink control channel may be monitored only on a set of a number of PRBs having a relatively low PRB index, equal to or less than the maximum number of PRBs, in the set of PRBs for monitoring control channel.

Further, the MTC device may assume that PRBs in which the downlink control channel is not monitored in the set of PRBs for monitoring control channel are punctured or rate-matched.

Further, the set of PRBs for monitoring control channel may be set independently of a set of data channel monitoring PRBs in which the MTC device needs to monitor a downlink data channel.

Further, the set of PRBs for monitoring control channel may be set the same as a set of data channel monitoring PRBs in which the MTC device needs to monitor a downlink data channel.

Further, the maximum number of PRBs for the downlink control channel may be set independently of a maximum number of PRBs which are available for the base station to transmit a downlink data channel.

Further, the maximum number of PRBs for the downlink control channel may be set such that a sum of the maximum number of PRBs for the downlink control channel and a maximum number of PRBs which are available for the base station to transmit a downlink data channel is a reference PRB number.

Here, the reference PRB number may be 6.

Further, the downlink control channel may be an enhanced physical downlink control channel (EPDCCH), and the downlink data channel may be a physical downlink shared channel (PDSCH).

To achieve the foregoing aspect, a UE according to the disclosure of the present specification is an MTC device for receiving a downlink control channel, the MTC device including a radio frequency (RF) unit to receive configuration information on a maximum number of PRBs which are available for a base station to transmit the downlink control channel and configuration information on a set of PRBs for monitoring control channel in which the MTC device needs to monitor the downlink control channel; and a processor to monitor the downlink control channel on the PRBs according to the configuration information on the set of PRBs for monitoring control channel, wherein when a number of the PRBs based on the set of PRBs for monitoring control channel exceeds the maximum number of PRBs, the processor may monitor the downlink control channel only on a set of a number of PRBs equal to or less than the maximum number of PRBs.

According to the disclosure of the present specification, the foregoing problem of the conventional technology. More specifically, according to the disclosure of the present specification, a low-cost or low-complexity MTC device may efficiently receive a downlink control channel on a restricted bandwidth.

Figure 1:
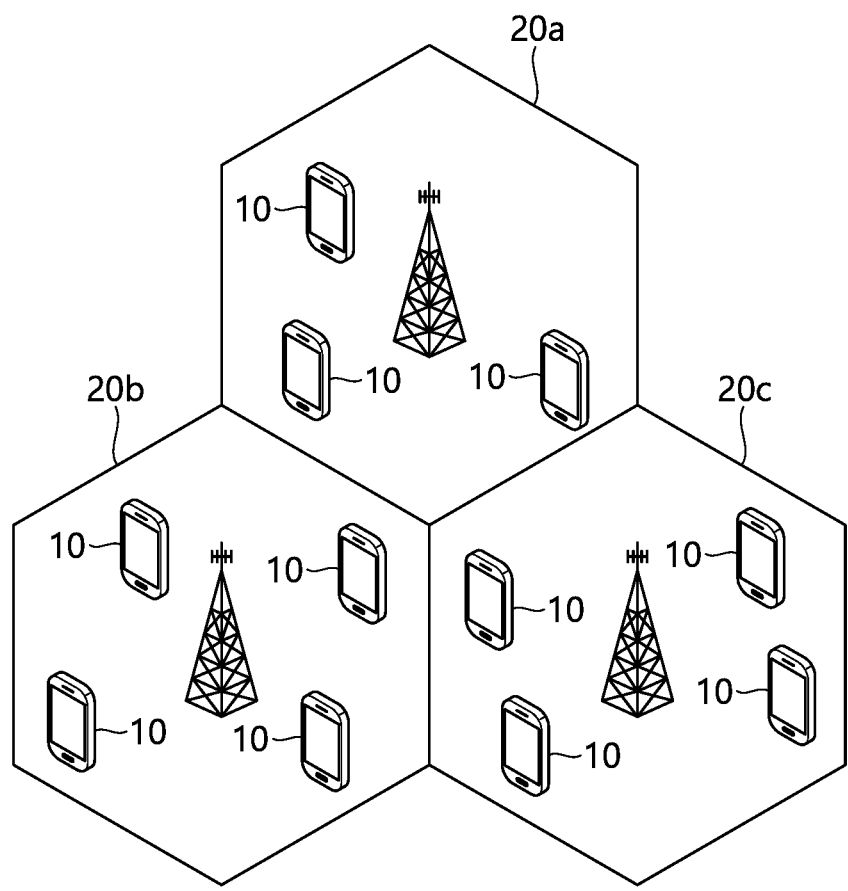
FIG. 1 illustrates a wireless communication system.

DESCRIPTION OF EXEMPLARY
EMBODIMENTS

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
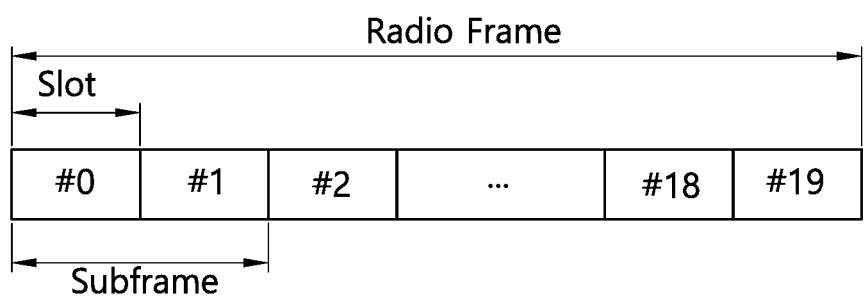
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
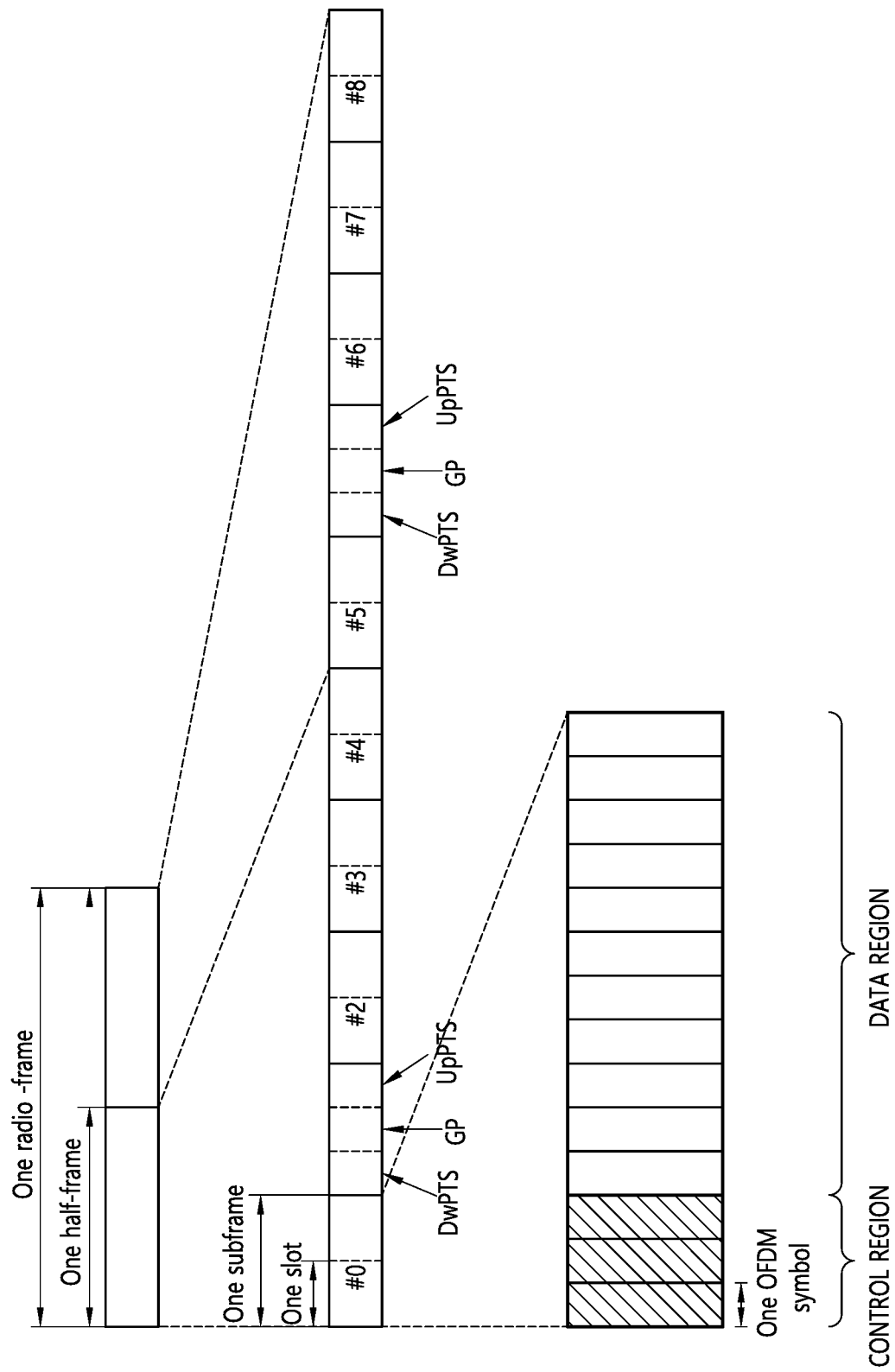
FIG. 3 illustrates a structure of a downlink radio frame according to time division duplex (TDD) in 3GPP LTE.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
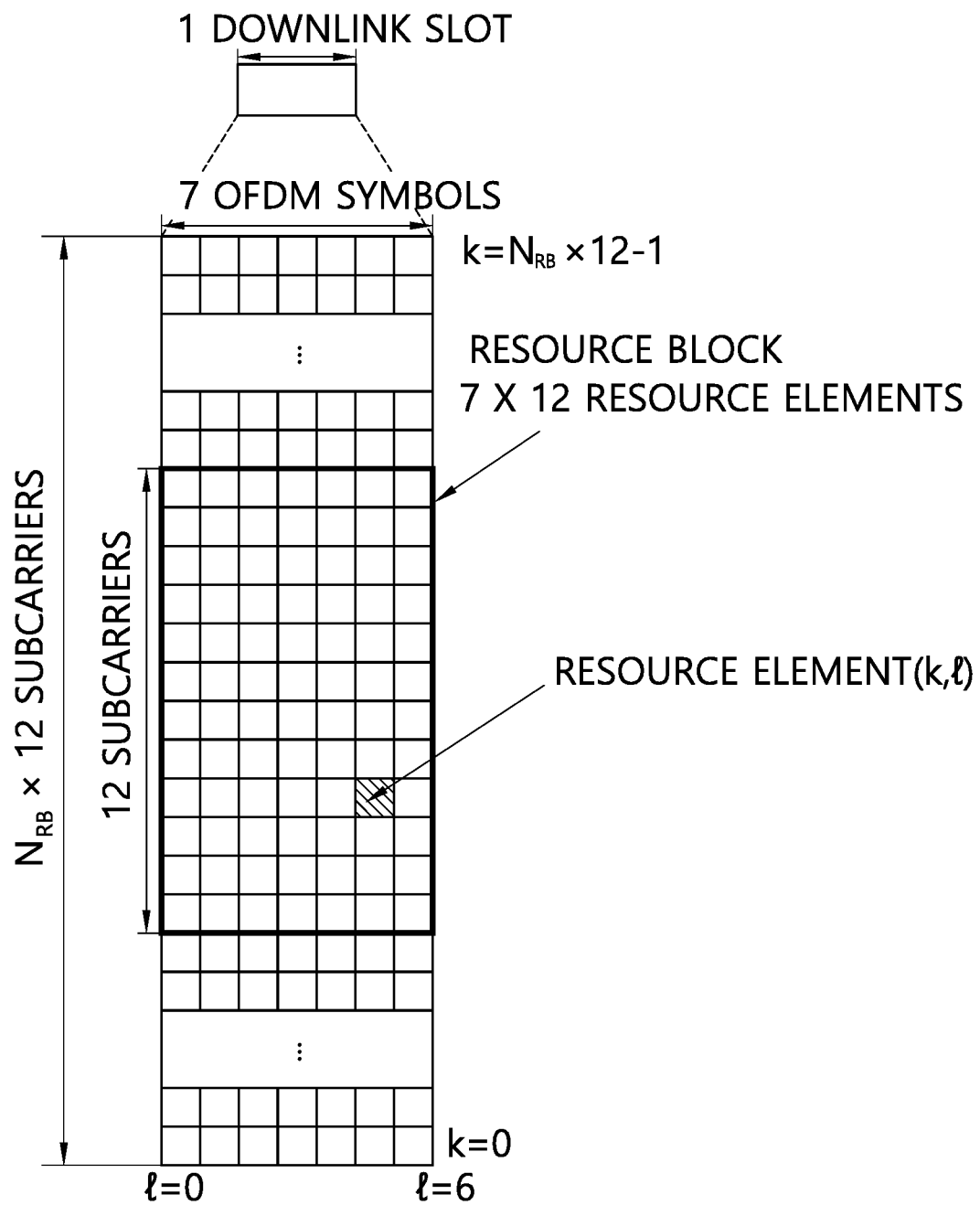
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RB s) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
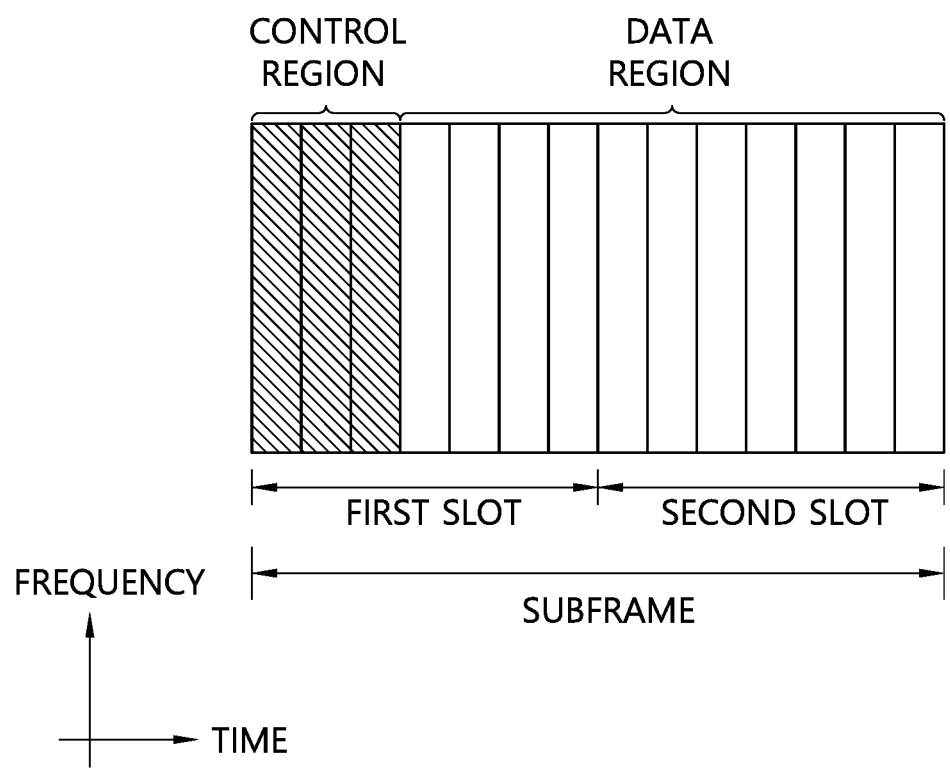
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
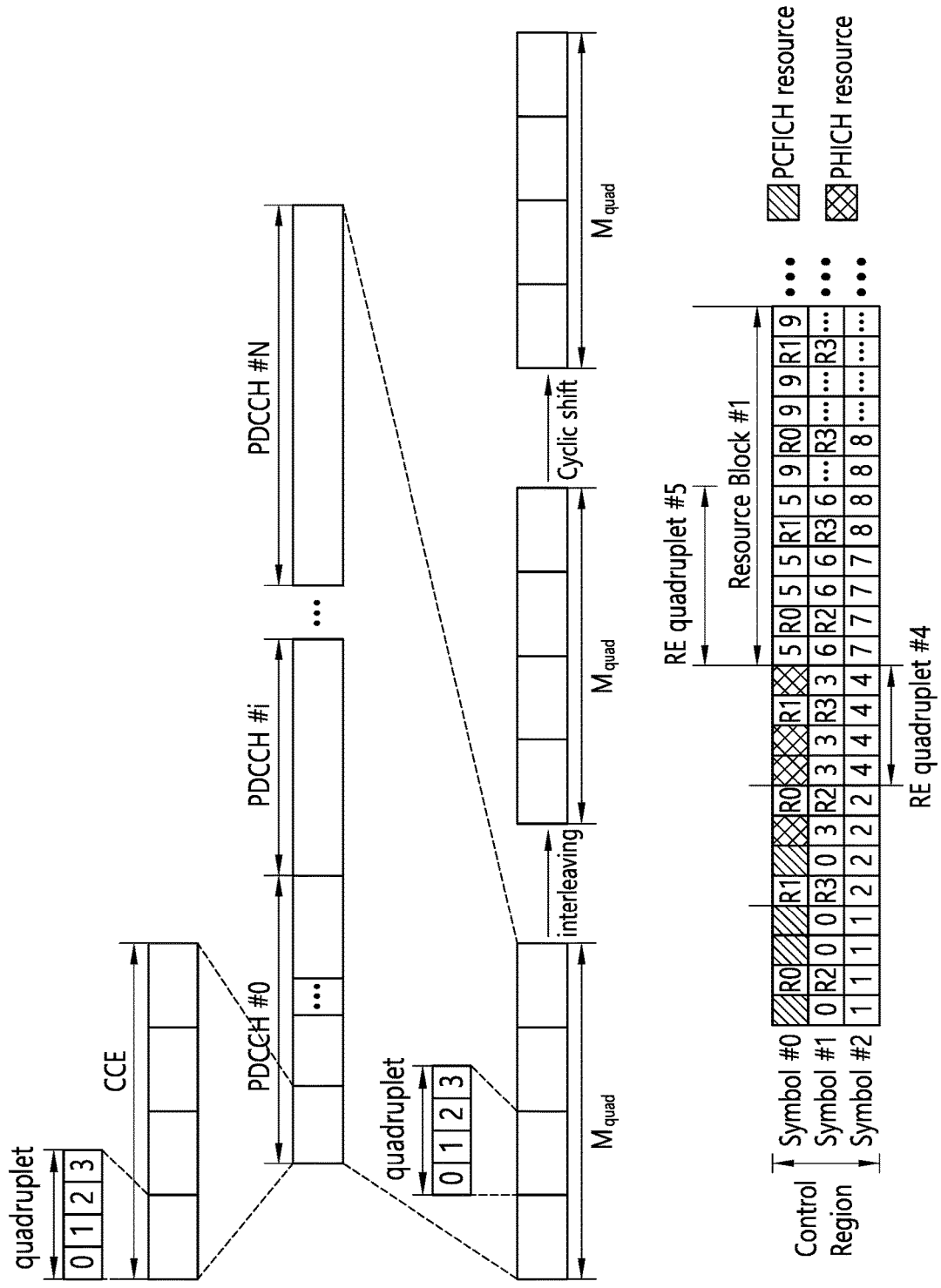
FIG. 6 illustrates an example of resource mapping of a physical downlink control channel (PDCCH).

FIG. 6 illustrates an example of resource mapping of a PDCCH.

R0 denotes a reference signal of a $1^{st}$ antenna, R1 denotes a reference signal of a $2^{nd}$ antenna, R2 denotes a reference signal of a $3^{rd}$ antenna, and R3 denotes a reference signal of a $4^{th}$ antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

A BS determines the number of CCEs used in transmission of the PDCCH according to a channel state. For example, a UE having a good DL channel state may use one CCE in PDCCH transmission. A UE having a poor DL channel state may use 8 CCEs in PDCCH transmission.

One REG (indicated by a quadruplet in the drawing) includes 4 REs. One CCE includes 9 REGs. The number of CCEs used to configure one PDCCH may be selected from $\{1, 2, 4, 8\}$. Each element of $\{1, 2, 4, 8\}$ is referred to as a CCE aggregation level.

A control channel consisting of one or more CCEs performs interleaving in unit of REG, and is mapped to a physical resource after performing cyclic shift based on a cell identifier (ID).

Figure 7:
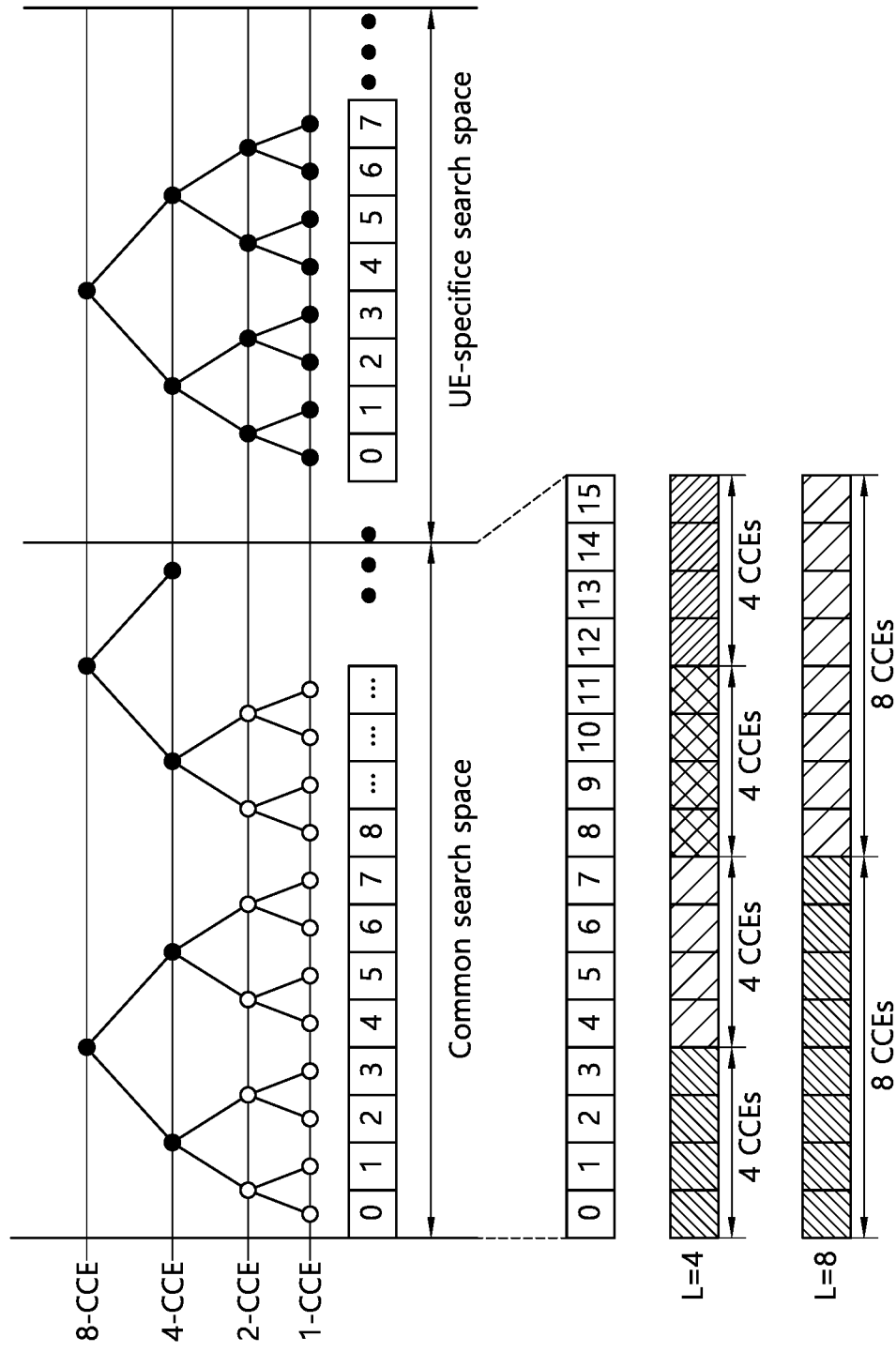
FIG. 7 illustrates an example of monitoring of a PDCCH.

FIG. 7 illustrates an example of monitoring of a PDCCH.

A UE cannot know about a specific position in a control region in which its PDCCH is transmitted and about a specific CCE aggregation or DCI format used for transmission. A plurality of PDCCHs can be transmitted in one subframe, and thus the UE monitors the plurality of PDCCHs in every subframe. Herein, monitoring is an operation of attempting PDCCH decoding by the UE according to a PDCCH format.

The 3GPP LTE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of $\{1, 2, 4, 8\}$.

Table 2 below shows the number of PDCCH candidates monitored by a wireless device.

TABLE 2

| Type | Search space $S^{(L)}_k$ | | Number $M^{(L)}$ of PDCCH candidates |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space $S^{(L)}_k$ is defined as a set of PDCCH candidates. A CCE corresponding to a PDCCH candidate m of the search space $S^{(L)}_k$ is given by Equation 1 below.

$$L\{(Y_k+m') \bmod \lfloor N_{CCE,k}/L \rfloor\}+i \quad \text{[Equation 1]}$$

Herein, i=0, 1, ..., L−1, m=0, ..., $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is configured for the wireless device, m'=m+$M^{(L)}n_{cif}$. Herein, $n_{cif}$ is a value of the CIF. If the CIF is not configured for the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k(A \cdot Y_{k-1}) \bmod D \quad \text{[Equation 2]}$$

Herein, $Y_{-1}=n_{RNTI}\neq 0$, A=39827, D=65537, k=floor($n_s/2$), and $n_s$ denotes a slot number in a radio frame.

When the UE monitors the PDCCH by using the C-RNTI, a search space and a DCI format used in monitoring are determined according to a transmission mode of the PDSCH.

Meanwhile, when the UE monitors the PDCCH by using the C-RNTI, a search space and a DCI format used in monitoring are determined according to a transmission mode (TM) of the PDSCH. Table 3 below shows an example of PDCCH monitoring for which the C-RNTI is configured.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |

TABLE 3-continued

| Transmission mode | DCI format | Search space | Transmission mode of PDSCH according to PDCCH |
|---|---|---|---|
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |

TABLE 4-continued

| DCI format | Contents |
| --- | --- |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 8:
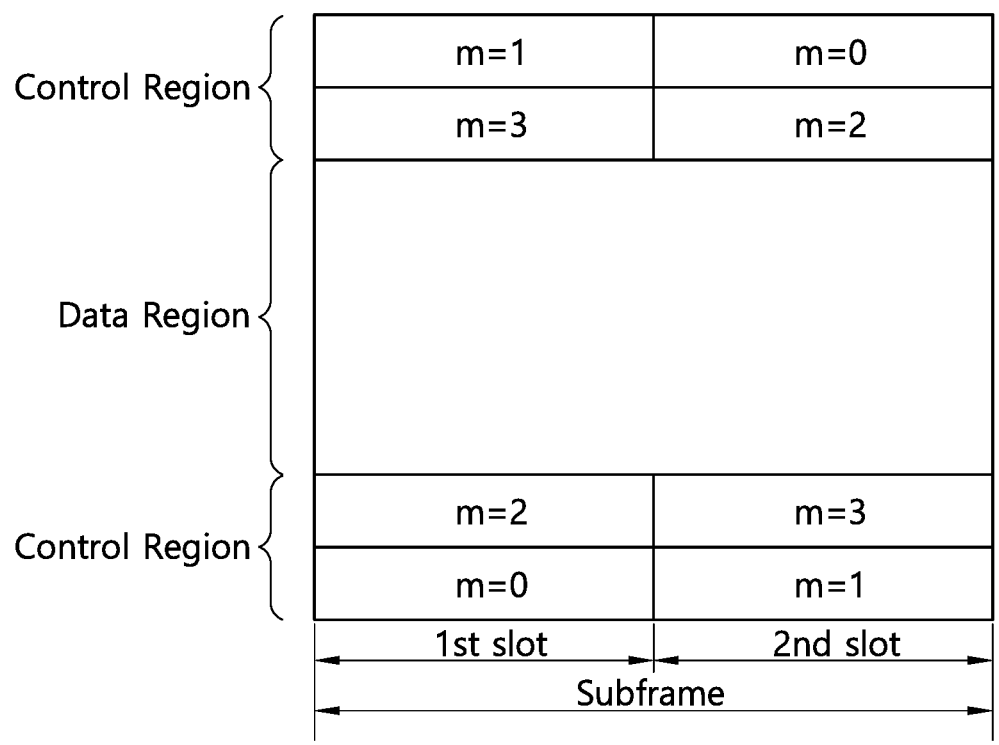
FIG. 8 illustrates the architecture of a UL subframe in 3GPP LTE.

FIG. 8 illustrates the architecture of a UL sub-frame in 3GPP LTE.

Referring to FIG. 8, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell.

The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 9:
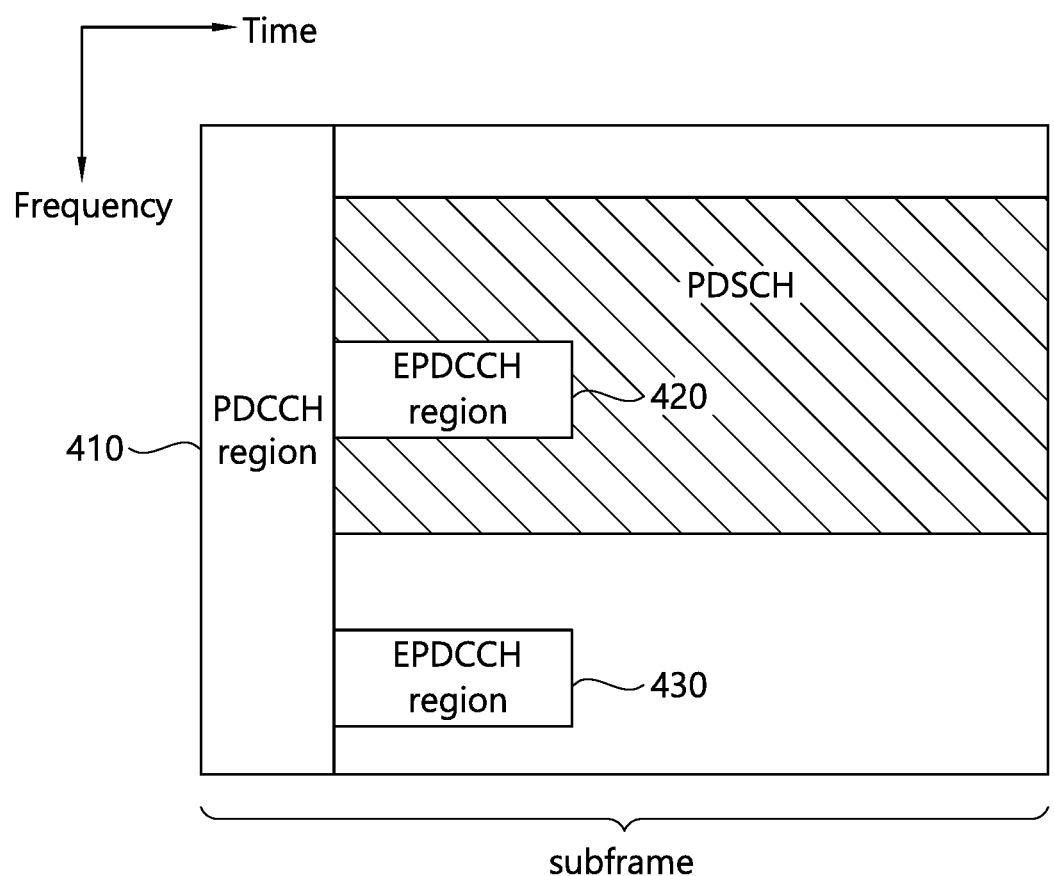
FIG. 9 illustrates a subframe having an enhanced PDCCH (EPDCCH).

FIG. 9 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

An RS sequence $r_{ns}(m)$ for the associated DM RS is represented by Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Here, m=0, 1, . . . , $2N_{maxRB}-1$, $N_{maxRB}$ denotes the maximum number of RBs, ns denotes the number of a slot in a radio frame, and l denotes the number of an OFDM symbol in a slot.

A pseudo-random sequence c(i) is defined by the following gold sequence with a length of 31.

Here, m=0, 1, . . . , $12N_{RB}-1$, and $N_{RB}$ denotes the maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ in each starting subframe. ns is the number of a slot in a radio frame, $N_{EPDCCH,ID}$ is a value associated with an EPDCCH set, which is given through a higher-layer signal, and $n_{EPDCCH,SCID}$ is a specific value.

The EPDCCH regions 420 and 430 may be used for scheduling for different cells, respectively. For example, an EPDCCH in the EPDCCH region 420 may carry scheduling information for a primary cell, and an EPDCCH in the EPDCCH region 430 may carry scheduling information for a secondary cell.

When EPDCCHs are transmitted in the EPDCCH regions 420 and 430 through multiple antennas, the same precoding as for the EPDCCHs may be applied to DM RSs in the EPDCCH regions 420 and 430.

Comparing with a CCE used as a transmission resource unit for a PDCCH, a transmission resource unit for an EPDCCH is an enhanced control channel element (ECCE). An aggregation level may be defined as a resource unit for monitoring an EPDCCH. For example, defining one ECCE as a minimum resource for an EPDCCH, an aggregation level may be defined as L={1, 2, 4, 8, 16}.

Hereinafter, an EPDCCH search space may correspond to an EPDCCH region. In an EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs according to a subframe type based on a TDD DL-UL configuration and a CP. For example, an ECCE may include four EREGs in a normal CP, while an ECCE may include eight EREGs in an extended CP.

A physical resource block (PRB) pair refers to two PRBs having the same RB number in one subframe. A PRB pair refers to a first PRB of a first slot and a second PRB of a second slot in the same frequency domain. In a normal CP, a PRB pair includes 12 subcarriers and 14 OFDM symbols and thus includes 168 REs.

Figure 10:
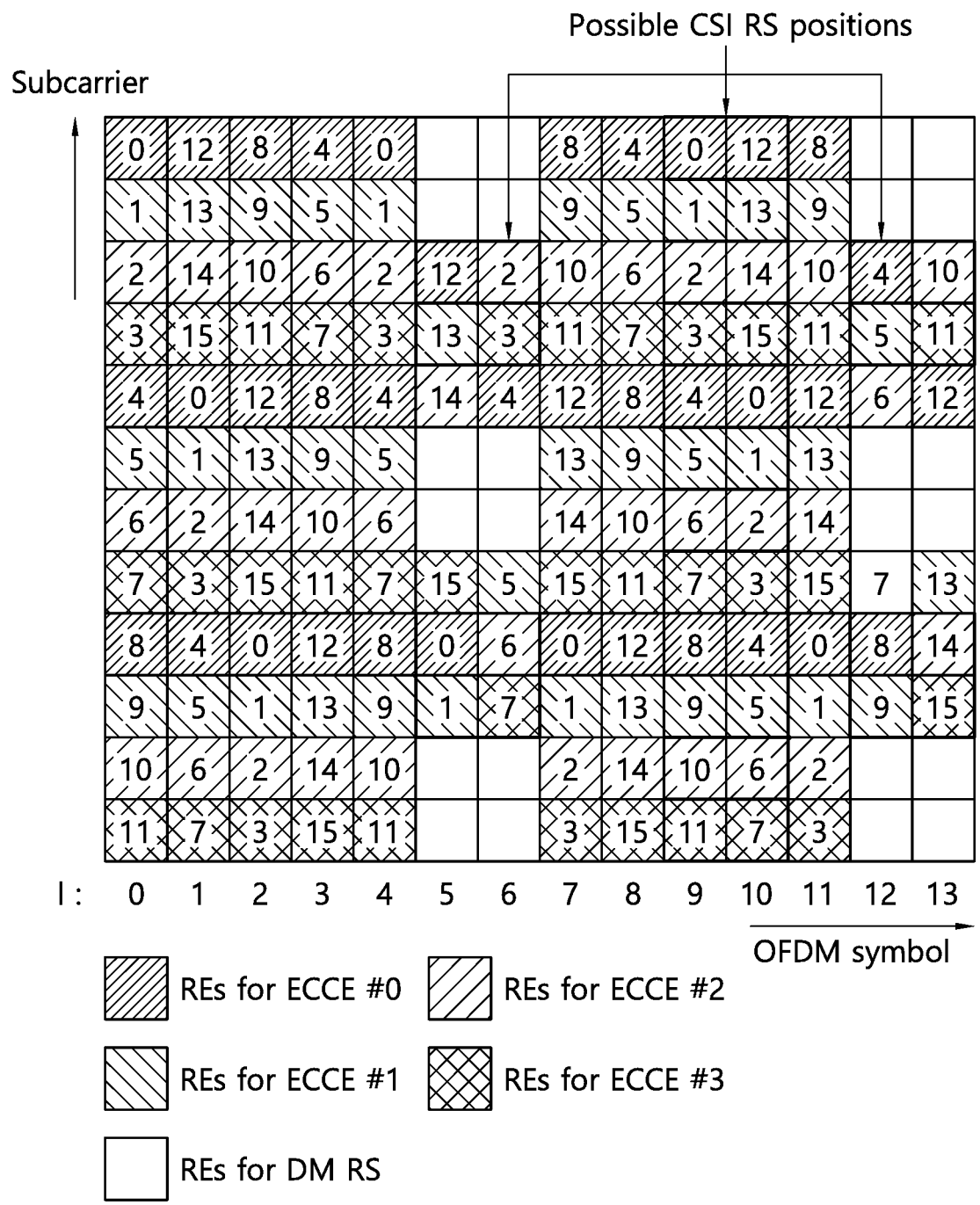
FIG. 10 illustrates an example of a physical resource block (PRB) pair.

FIG. 10 illustrates an example of a PRB pair.

Although it is shown below that a subframe includes two slots and a PRB pair in one slot includes seven OFDM symbols and 12 subcarriers, these numbers of OFDM symbols and subcarriers are provided for illustrative purposes only.

In one subframe, a PRB pair includes 168 REs. 16 EREGs are formed from 144 Res, excluding 24 REs for a DM RS. Thus, one EREG may include nine REs. Here, a CSI-RS or CRS may be disposed in one PRB pair in addition the DM RM. In this case, the number of available REs may be reduced and the number of REs included in one EREG may be reduced. The number of REs included in an EREG may change, while the number of EREGs included in one PRB pair, 16, does not change.

Here, as illustrated in FIG. 10, REs may sequentially be assigned indexes, starting from a top subcarrier in a leftmost OFDM symbol (l=0) (or REs may sequentially be assigned indexes in an upward direction, starting from a bottom subcarrier in the leftmost OFDM symbol (l=0)). Suppose that 16 EREGs are assigned indexes from 0 to 15. Here, nine REs having RE index 0 are allocated to EREG 0. Likewise, nine REs having RE index k (k=0, . . . , 15) are allocated to EREG k.

A plurality of EREGs is combined to define an EREG group. For example, an EREG group including four EREGs may be defined as follows: EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. An EREG group including eight EREGs may be defined as follows: EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE may include four EREGs, and an ECCE may include eight EREGs in an extended CP. An ECCE is defined by an ERGE group. For example, FIG. 6 shows that ECCE #0 includes EREG group #0, ECCE #1 includes EREG group #1, ECCE #2 includes EREG group #2, and ECCE #3 includes EREG group #3.

There are localized transmission and distributed transmission in ECCE-to-EREG mapping. In localized transmission, an EREG group forming one ECCE is selected from EREGs in one PRB pair. In distributed transmission, an EREG group forming one ECCE is selected from EREGs in different PRB pairs.

Hereinafter, machine-type communication (MTC) will be described.

Figure 11A:
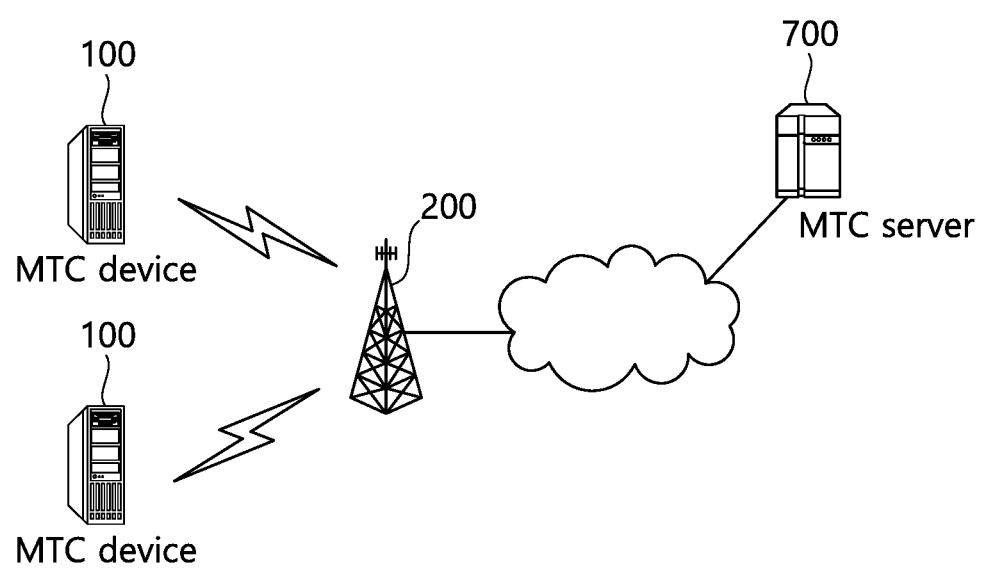
FIG. 11a illustrates an example of machine-type communication (MTC).

FIG. 11*a* illustrates an example of MTC.

MTC refers to an information exchange between MTC devices 100 via a BS 200 or information exchange between an MTC device 100 and an MTC server 700 via a BS without involving human interactions.

The MTC server 700 is an entity to communicate with the MTC device 100. The MTC server 700 runs an MTC application and provides the MTC device with an MTC-specific service.

The MTC device 100 is a wireless device to provide MTC communication, which may be stationary or mobile.

Services provided through MTC are differentiated from existing communication services involving human intervention and an MTC service range is wide, for example, tracking, metering, payment, medical services, remote control, or the like. More specifically, examples of MTC services may include reading a meter, measuring a water level, utilizing a surveillance camera, inventory reporting of a vending machine, etc.

The MTC device is characterized in that a transmission data amount is small and uplink/downlink data transmission/reception occurs sometimes. Therefore, it is effective to decrease a unit cost of the MTC device and to decrease battery consumption according to a low data transmission rate. The MTC device is characterized by low mobility and thus has a channel environment that hardly changes.

Figure 11B:
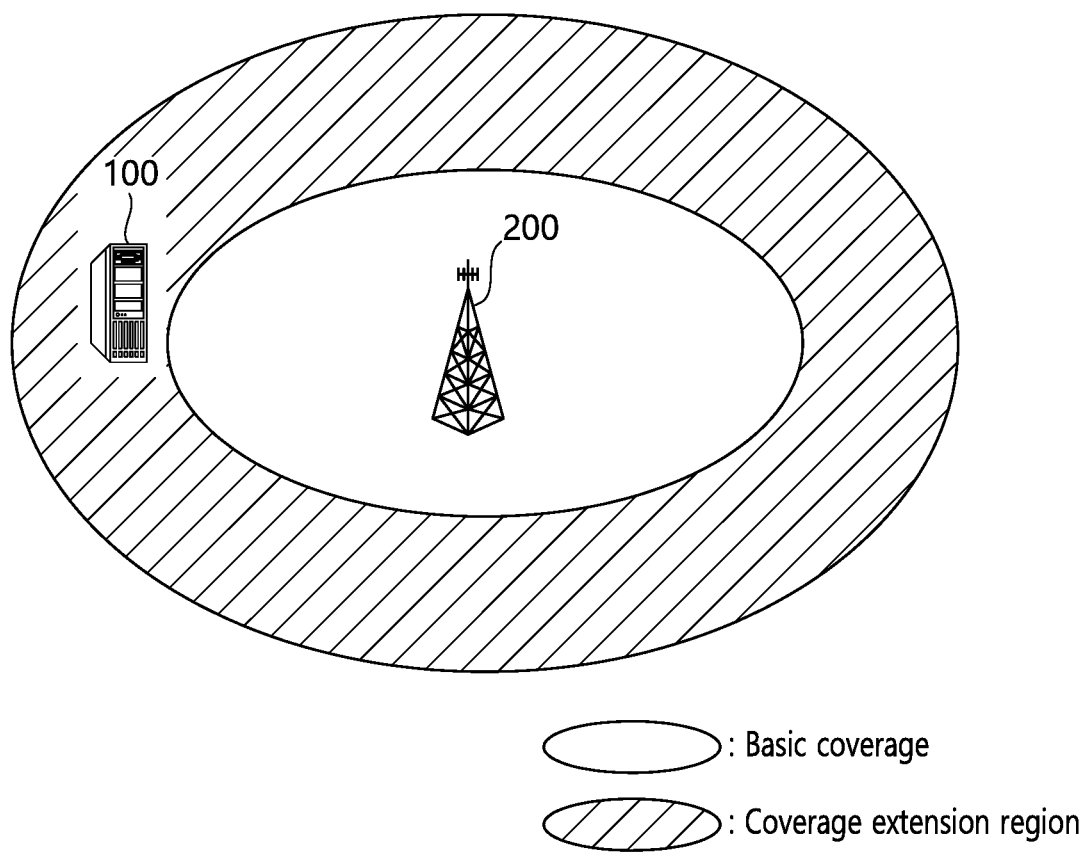
FIG. 11b illustrates an example of cell coverage extension for an MTC device.

FIG. 11*b* illustrates an example of cell coverage extension for an MTC device.

Recently, extension of cell coverage of a BS is considered for an MTC device 100, and various schemes for extending cell coverage are under discussion.

However, when the cell coverage is extended, if the BS transmits a PDSCH and a (E)PDCCH including scheduling information on the PDSCH to an MTC device located in the coverage extension region as if transmitting the PDSCH and the (E)PDCCH to a normal UE, the MTC device has difficulty in receiving the PDSCH and the (E)PDCCH.

Here, (E)PDCCH refers to a PDCCH or EPDCCH (E-PD-CCH).

<Disclosures of the Present Specification>

Thus, disclosures of the present specification are provided to solve the foregoing problem.

A method according to a disclosure of the present specification is a method for an MTC device to receive a downlink control channel, the method including: receiving configuration information on a maximum number of physical resource blocks (PRBs) which are available for a base station to transmit the downlink control channel; receiving configuration information on a set of PRBs for monitoring control channel in which the MTC device needs to monitor the downlink control channel; and monitoring the downlink control channel on the PRBs according to the configuration information on the set of PRBs for monitoring control channel.

In this case, when a number of the PRBs based on the set of PRBs for monitoring control channel exceeds the maximum number of PRBs, the downlink control channel may be monitored only on a set of a number of PRBs equal to or less than the maximum number of PRBs.

Here, the maximum number of PRBs for the downlink control channel may be 6.

Further, the downlink control channel may be monitored only on a set of a number of PRBs having a relatively low PRB index, equal to or less than the maximum number of PRBs, in the set of PRBs for monitoring control channel.

Further, the MTC device may assume that PRBs in which the downlink control channel is not monitored in the set of PRBs for monitoring control channel are punctured or rate-matched.

Further, the set of PRBs for monitoring control channel may be set independently of a set of data channel monitoring PRBs in which the MTC device needs to monitor a downlink data channel.

Further, the set of PRBs for monitoring control channel may be set the same as a set of data channel monitoring PRBs in which the MTC device needs to monitor a downlink data channel.

Further, the maximum number of PRBs for the downlink control channel may be set independently of a maximum number of PRBs which are available for the base station to transmit a downlink data channel.

Further, the maximum number of PRBs for the downlink control channel may be set such that a sum of the maximum number of PRBs for the downlink control channel and a maximum number of PRBs which are available for the base station to transmit a downlink data channel is a reference PRB number. Here, the reference PRB number may be 6.

For example, the downlink control channel may be an EPDCCH, and the downlink data channel may be a PDSCH.

The disclosures of the present specifications are described in detail as follows.

As described above, an MTC device (or MTC UE) has a small amount of data to transmit and occasionally performs uplink/downlink data transmission/reception. Therefore, it is efficient to decrease a unit cost of a terminal and to decrease battery consumption according to a low data transmission rate.

The MTC device is characterized by low mobility and thus has a channel environment that hardly changes. In LTE-A, it is currently considered to increase existing coverage for the MTC UE. To this end, various coverage enhancement schemes for the MTC UE are under discussion as follows.

The maximum bandwidth supported by normal LTE UEs is 20 MHz. One potential technique to reduce the UE cost is to reduce the maximum bandwidth that the UE supports from 20 MHz to a lower bandwidth (e.g., 1.4 MHz, 3 MHz or 5 MHz). The reduction of the maximum bandwidth can be applied to the downlink and/or uplink, the RF and/or baseband components, the data and/or control channels. To be more specific, the following options have been considered and evaluated, which allow the bandwidth reduction on the DL and UL to be considered separately.

DL

Option DL-1: Reduced bandwidth for both RF and baseband

Option DL-2: Reduced bandwidth for baseband only for both data channel and control channels Option DL-3: Reduced bandwidth for data channel in baseband only, while the control channels are still allowed to use the carrier bandwidth

UL

Option UL-1: Reduced bandwidth for both RF and baseband

Option UL-2: No bandwidth reduction

This option does not have any impact on coverage, power consumption, specifications, performance, and UE cost.

For all these options, the reduced bandwidth is assumed to be no less than 1.4 MHz, and the frequency location of the reduced bandwidth is assumed to be fixed at the center of the carrier bandwidth. Technically, any combination of the DL and UL options is possible. However, some of the combinations may make more practical sense. For example, DL-2 would be a more natural choice than DL-1 when combined with UL-2.

Note that this is not intended to be an exhaustive list of the possible options. Some interesting variations of these options could allow the frequency location of the reduced bandwidth to be changed semi-statically, dynamically, or in a pre-defined pattern for each UE. Some of these variations could potentially allow more MTC UEs to be supported in the system. Taking the extension of DL-3 as an example, If the frequency location of the data channel is semi-statically configured, it is expected to provide the same cost saving as DL-3, with some additional specification impact.

If the frequency location of the data channel is dynamically changed using grants, it would be the same as one of the techniques for reduced peak rate, restricting the number of PRBs, as discussed in Section 6.4.

Nonetheless, the discussion in this section is restricted to the options listed above.

With reduced bandwidth, the cost of RF and baseband components can potentially be reduced. Depending on which option is assumed, the relative cost savings and the specification impact can be different.

Particularly, the disclosures of the present specification may relate to Option DL-3 among the foregoing downlink bandwidth reduction options.

However, it would be obvious to those skilled in the art that the disclosures of the present specification are also applicable to the other options illustrated above.

Further, it would be obvious that the disclosures of the present specification are applicable to general UEs of small bandwidths as well as the MTC device or MTC UE.

Specifically, in a next-generation LTE-A system, a downlink channel bandwidth of 1.4 MHz or 6 RBs (or PRBs) may be suggested for low-cost or low-complexity MTC devices.

For example, although a PDCCH is transmitted via the entire downlink system bandwidth (for example, 10 MHz or 50 RBs), the maximum PDSCH bandwidth for a PDSCH may be 1.4 MHz or 6 RBs (or PRBs).

Alternatively, both a PDCCH and a PDSCH may be transmitted, for example, via 1.4 MHz or 6 RBs (or PRBs).

Figure 12:
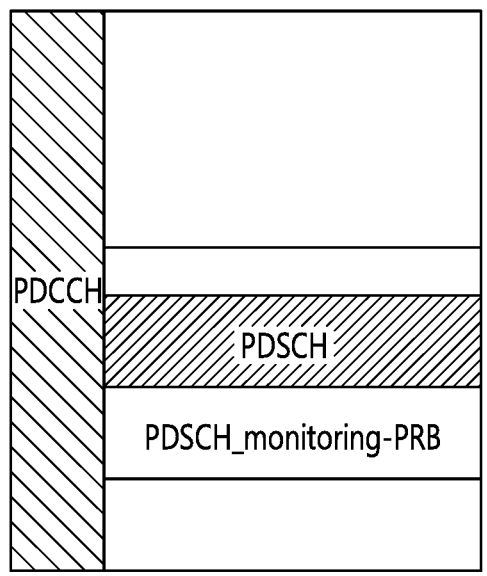
FIG. 12 illustrates an example of a PDSCH monitoring PRB region for an MTC device.

FIG. 12 illustrates an example of a PDSCH monitoring PRB region for an MTC device.

Referring to FIG. 12, defining a PRB region for transmitting a PDSCH as PDSCH_monitoring_PRB and the maximum bandwidth (or the number of PRBs) for transmitting a PDSCH as Max_PDSCH_BW for convenience, Max_PDSCH_BW may be 1.4 MHz (6 RBs).

Here, PDSCH_monitoring_PRB may denote a set of data channel monitoring PRBs in which the MTC device needs to monitor a downlink data channel, and Max_PDSCH_BW may denote the maximum number of PRBs available for a base station to transmit the downlink data channel.

In the disclosures of the present specification, it is assumed that Max_PDSCH_BW is 1.4 MHz or 6 PRBs. Here, PDSCH_monitoring_PRB may include six non-contiguous PRBs.

In this case, Max_PDSCH_BW may denote the number of non-contiguous PRBs (or the total length of regions (in Hz)) for transmitting a PDSCH.

It would be obvious to those skilled in the art that the disclosures of the present specification are applicable the same to different Max_PDSCH_BW in addition to 1.4 Hz (6 RBs).

Meanwhile, an EPDCCH may be used for low-cost MTC using a reduced PDSCH bandwidth. In this case, it may be also considered to reduce a bandwidth for transmitting the EPDCCH for the low cost of an MTC device.

Therefore, the disclosures of the present specification suggest setting modes of a reduced bandwidth for an EPDCCH as follows.

<Bandwidth Restriction for EPDCCH>

An EPDCCH may be used for a low-cost MTC device using a reduced PDSCH bandwidth. In this case, it may be also considered to reduce a bandwidth for transmitting the EPDCCH for the low cost of the MTC device.

Here, EPDCCH_monitoring_PRB may denote a set of PRBs for monitoring the control channel in which the MTC device needs to monitor a downlink control channel, and Max_EPDCCH_BW may denote the maximum number of PRBs available for a base station to transmit the downlink data channel.

In this case, EPDCCH_monitoring_PRB may include non-contiguous PRBs. In this case, Max_EPDCCH_BW may denote the number of non-contiguous PRBs (or the total length of regions (in Hz)) for transmitting an EPDCCH.

The following modes may be used to set up EPDCCH_monitoring_PRB according to the disclosures of the present specification.

Setting Mode A

According to setting mode A, EPDCCH_monitoring_PRB may be set independently of PDSCH_monitoring_PRB.

That is, according to setting mode A, a set of PRBs for monitoring control channel may be set independently of a set of data channel monitoring PRBs in which the MTC device needs to monitor a downlink data channel.

Setting Mode B

According to setting mode B, EPDCCH_monitoring_PRB may be set the same as PDSCH_monitoring_PRB.

That is, a set of PRBs for monitoring control channel may be set the same as a set of data channel monitoring PRBs in which the MTC device needs to monitor a downlink data channel.

Further, when Max_EPDCCH_BW is greater than Max_PDSCH_BW, EPDCCH_monitoring_PRB may be set to always include PDSCH_monitoring_PRB.

Further, when Max_EPDCCH_BW is smaller than Max_PDSCH_BW, EPDCCH_monitoring_PRB may be set to be always included in PDSCH_monitoring_PRB.

In addition, the following modes may be used to set up Max_EPDCCH_BW as the maximum bandwidth for transmitting an EPDCCH according to the disclosures of the present specification.

Setting Mode 1

According to setting mode 1, Max_EPDCCH_BW may be set independently of Max_PDSCH_BW.

That is, the maximum number of PRBs for a downlink control channel may be set independently of the maximum number of PRBs available for a base station to transmit a downlink data channel.

For example, when Max_PDSCH_BW is 6 RBs, Max_EPDCCH_BW may be set to 4 RBs.

Setting Mode 2

According to setting mode 2, defining a bandwidth of a PRB region including EPDCCH_monitoring_PRB and PDSCH_monitoring_PRB as Max_PDSCH_EPDCCH_BW, Max_PDSCH_EPDCCH_BW may be set to be specific PRBs or reference PRBs (for example, 6 PRBs).

That is, the maximum number of PRBs for a downlink control channel may be set such that the sum of the maximum number of PRBs for the downlink control channel and the maximum number of PRBs available for the base station to transmit a downlink data channel is specific PRBs or reference PRBs. Here, the number of reference PRBs may be 6.

For example, when EPDCCH_monitoring_PRB includes PRBs of indexes 1 to 4 and PDSCH_monitoring_PRB includes PRBs of indexes 2 to 6, Max_PDSCH_EPDCCH_BW, that is, the number of PRBs in a PRB region including EPDCCH_monitoring_PRB and PDSCH_monitoring_PRB, is 6 PRBs, which satisfies the given condition.

Further, for example, when EPDCCH_monitoring_PRB includes PRBs of indexes of and 4 and PDSCH_monitoring_PRB includes PRBs of indexes 6 to 9, Max_PDSCH_EPDCCH_BW, that is, the number of PRBs in a PRB region including EPDCCH_monitoring_PRB and PDSCH_monitoring_PRB, is 6 PRBs, which satisfies the given condition.

Therefore, according to setting mode 2, the number of PRBs available for EPDCCH_monitoring_PRB and PDSCH_monitoring_PRB may vary depending on the positions/configurations of EPDCCH_monitoring_PRB and PDSCH_monitoring_PRB.

Hereinafter, the aforementioned setting mode 1 of the Max_EPDCCH_BW setting modes will be described in detail as a first aspect of the disclosures of the present specification and the aforementioned setting mode 2 of the Max_EPDCCH_BW setting modes will be described in detail as a second aspect of the disclosures of the present specification.

<First Aspect of Disclosures of the Present Specification: Independent Setting of Max_EPDCCH_BW>

The first aspect of the disclosures of the present specification is described assuming that the maximum bandwidth for transmitting an EPDCCH is set up according to the aforementioned setting mode 1. However, it would be obvious to those skilled in the art that the aforementioned setting mode 2 is applicable to the technique disclosed in the first aspect of the disclosures of the present specification.

To set up Max_EPDCCH_BW independently of Max_PDSCH_BW for a low-cost MTC device with a limited buffer size as in setting mode 1, it may not allowed to receive a PDCCH in an EPDCCH transmitting subframe.

Thus, the first aspect of the disclosures of the present specification suggests that the MTC device not monitor a CSS (and a USS) transmitted via a PDCCH assuming that a CSS (and a USS) is not transmitted via a PDCCH in an EPDCCH monitoring subframe.

For example, although Max_EPDCCH_BW is set to 6 PRBs, the MTC device or UE may be assigned, by the base station (eNodeB), a PRB set for an EPDCCH including 8 PRBs for monitoring an EPDCCH, that is, an EPDCCH PRB set.

As such, when the MTC device is assigned, by the eNodeB, an EPDCCH PRB set including a PRB region that is greater than Max_EPDCCH_BW, the MTC device may receive an EPDCCH via the EPDCCH PRB set according to the following method.

The MTC device may receive the EPDCCH only via Max_EPDCCH_BW (for example, six) PRBs having lower (or higher) PRB indexes. Here, the MTC device may assume that the EPDCCH is transmitted via puncturing or rate-matching in a PRB region that the MTC device is unable to receive in the PRB region forming the EPDCCH PRB set.

That is, the MTC device may monitor the downlink control channel only on a set of a number of PRBs having relatively lower PRB indexes, equal to or smaller than the maximum number of PRBs, in the set of PRBs for monitoring control channel, assuming that PRBs in which the downlink control channel is not monitored in the set of the PRBs for monitoring control channel are punctured or rate-matched.

When the MTC device having limited Max_EPDCCH_BW is assigned multiple EPDCCH PRB sets by the base station and the number of PRBs in a region including two EPDCCH PRB sets exceeds Max_PDSCH_EPDCCH_BW (for example, 6 PRBs), PRB regions received by the MTC device may be prioritized as follows.

1) A PRB region of an EPDCCH PRB set having a low index
2) A PRB region having a low index in the same EPDCCH PRB set That is, for example, in a case where Max_EPDCCH_BW is 6 PRBs, when the MTC device is assigned two EPDCCH PRB sets including 4 PRBs, the MTC device may receive the entire PRB region of EPDCCH PRB set 0 and may receive 2 PRBs having lower indexes in EPDCCH PRB set 1. Here, the MTC device may assume that the EPDCCH is transmitted via puncturing or rate-matching in a PRB region that the MTC device is unable to receive in the PRB region forming the EPDCCH PRB set.

<Second Aspect of Disclosures of the Present Specification: Restriction of Max_EPDCCH_BW>

The second aspect of the disclosures of the present specification is described assuming that the maximum bandwidth for transmitting an EPDCCH is set up according to the aforementioned setting mode 2.

However, it would be obvious that the idea of the present invention is also applicable even when setting mode 2 is not employed.

Hereinafter, the second aspect of the disclosures of the present specification is described with reference to separate cases, which are a first embodiment where cross subframe scheduling is used and a second embodiment where same-subframe scheduling with semi-static PDSCH_monitoring_PRB allocation is used.

First Embodiment of Second Aspect: Cross Subframe Scheduling

According to the first embodiment of the second aspect, when scheduling with a PDCCH and/or EPDCCH is performed for PDSCH transmission to the low-cost MTC device, cross subframe scheduling may be employed.

Figure 13:
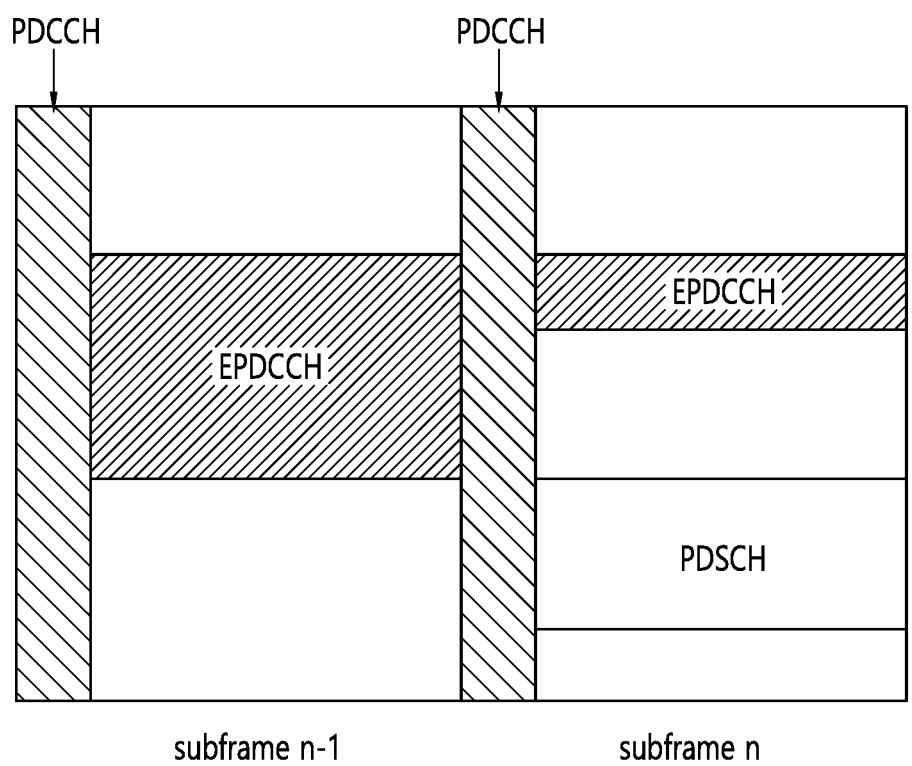
FIG. 13 illustrates an example of cross subframe scheduling for an MTC device.

FIG. 13 illustrates an example of cross subframe scheduling for an MTC device.

Referring to FIG. 13, when a PDSCH is scheduled through a PDCCH or EPDCCH in subframe n−1 (or subframe preceding subframe n−1), the scheduled PDSCH may be transmitted through the PDCCH or EPDCCH in subframe n.

In this case, as illustrated in FIG. 13, the scheduled PDSCH may be transmitted in subframe n through cross subframe scheduling. Further, the EPDCCH may also be transmitted in subframe n. Here, a PDSCH monitoring PRB in subframe n may be a PRB region in which the scheduled PDSCH is transmitted. Further, an EPDCCH monitoring PRB may be a PRB region for transmitting the EPDCCH (for example, a PRB region forming EPDCCH PRB sets).

Here, a bandwidth of a PRB region including the PDSCH monitoring PRB and the EPDCCH monitoring PRB in subframe n may exceed Max_PDSCH_EPDCCH_BW (for example, 6 RBs). To prevent this situation or in the occurrence of this situation, the second embodiment of the second aspect of the disclosures of the present specification suggests that the PDSCH and EPDCCH be received as follows.

Reception Mode 1-1

According to reception mode 1-1, when the number of PRBs in a region including PDSCH monitoring PRBs (PDSCH transmitting PRB region) and EPDCCH monitoring PRBs in a specific subframe exceeds Max_PDSCH_EPDCCH_BW (for example, 6 RBs), the MTC device does not perform EPDCCH monitoring (EPDCCH reception) in that subframe.

That is, the MTC device assumes that no EPDCCH is transmitted in that subframe.

Reception Mode 1-2

According to reception mode 1-2, the MTC device does not perform EPDCCH monitoring in a PDSCH-scheduled subframe.

That is, the MTC device may assume that no EPDCCH is transmitted in the PDSCH-scheduled subframe.

Reception Mode 1-3

According to reception mode 1-3, the MTC device monitors a PDCCH in a PDSCH-scheduled subframe.

That is, although subframe n is an EPDCCH monitoring subframe, if a PDSCH is transmitted in that subframe, the MTC device may assume that DCI is transmitted through a PDCCH, not through an EPDCCH.

Reception Mode 1-4

According to reception mode 1-4, when the number of PRBs in a region including PDSCH monitoring PRBs (PDSCH transmitting PRB region) and EPDCCH monitoring PRBs in a specific subframe exceeds Max_PDSCH_EPDCCH_BW (for example, 6 RBs), PRB regions received by the MTC device may be prioritized as follows.

1) A PDSCH transmitting PRB region
2) A PRB region forming an EPDCCH PRB set having a low index in a case of a plurality of EPDCCH PRB sets
3) A PRB having a low PRB index in a PRB region forming an EPDCCH PRB set Here, there may be an EPDCCH PRB region which is not received according to the foregoing priorities. Here, the MTC device may assume that the EPDCCH is transmitted via puncturing or rate-matching in the PRB region which is not received according to the foregoing priorities in the PRB region forming the EPDCCH PRB set.

Second Embodiment of Second Aspect: Same-Subframe Scheduling with Semi-Static PDSCH_Monitoring_PRB Allocation According to the second embodiment of the second aspect, when scheduling with a PDCCH and/or EPDCCH is performed for PDSCH transmission to the low-cost MTC device, a semi-static PRB region for transmitting a PDSCH (for example, PDSCH_monitoring_PRB) may be determined and a PDSCH transmitting PRB region may be designated with a PDCCH and/or EPDCCH within the PRB region (PDSCH location(s) within a limited number of semi-static PRBs, with (E)PDCCH within same subframe to indicate exact resource allocation).

Here, a bandwidth of a PRB region including PDSCH monitoring PRBs and EPDCCH monitoring PRBs may exceed Max_PDSCH_EPDCCH_BW (for example, 6 RBs). To prevent this situation or in the occurrence of this situation, the first embodiment of the second aspect of the disclosures of the present specification suggests that the PDSCH and EPDCCH be received as follows.

Reception Mode 2-1

According to reception mode 2-1, when the number of PRBs in a region including PDSCH monitoring PRBs and EPDCCH monitoring PRBs in a specific subframe exceeds Max_PDSCH_EPDCCH_BW (for example, 6 RBs), the MTC device does not perform EPDCCH monitoring (EPDCCH reception) in that subframe.

That is, the MTC device assumes that no EPDCCH is transmitted in that subframe.

Reception Mode 2-2

According to reception mode 2-2, the foregoing setting mode B is employed to prevent the bandwidth of the PRB region including the PDSCH monitoring PRB and the EPDCCH monitoring PRB from exceeding Max_PDSCH_EPDCCH_BW (for example, 6 RB s).

That is, EPDCCH_monitoring_PRB may be set to be always the same as PDSCH_monitoring_PRB. Alternatively, when Max_EPDCCH_BW is greater than Max_PDSCH_BW, EPDCCH_monitoring_PRB may be set to always include PDSCH_monitoring_PRB. When Max_EPDCCH_BW is smaller than Max_PDSCH_BW, EPDCCH_monitoring_PRB may be set to be always included in PDSCH_monitoring_PRB.

Reception Mode 2-3

According to reception mode 2-3, when the number of PRBs in a region including PDSCH monitoring PRBs and EPDCCH monitoring PRBs in a specific subframe exceeds Max_PDSCH_EPDCCH_BW (for example, 6 RBs), PRB regions received by the MTC device may be prioritized as follows.

1) A PDSCH monitoring PRB region
2) A PRB region forming an EPDCCH PRB set having a low index in a case of a plurality of EPDCCH PRB sets
3) A PRB having a low PRB index in a PRB region forming an EPDCCH PRB set There may be an EPDCCH PRB region which is not received according to the foregoing priorities. Here, the MTC device may assume that the EPDCCH is transmitted via puncturing or rate-matching in the PRB region which is not received in the PRB region forming the EPDCCH PRB set.

Here, the MTC device may assume that EPDCCH_monitoring_PRB (EPDCCH PRB set(s)) is PDSCH_monitoring_PRB, without being assigned separate PDSCH_monitoring_PRB from the base station.

Hereinafter, additional disclosures of the present specification are illustrated.

<Additional Disclosure of the Present Specification—Collision Between EPDCCH and PDSCH Transmission Resources>

Meanwhile, a PDSCH may be scheduled for a low-cost MTC device through cross subframe scheduling.

Thus, as illustrated in FIG. 13, a PDSCH scheduled with a PDCCH or EPDCCH prior to subframe n−1 may be transmitted to the MTC device in subframe n, and the MTC device may receive an EPDCCH in subframe n.

Here, when the MTC device receives an EPDCCH in subframe n and PDSCH transmitting REs (or PRBs) scheduled via the EPDCCH and via a PDCCH or EPDCCH prior to subframe n−1 (or scheduled semi-persistently) overlap or to prevent the PDSCH transmitting REs (or PRBs) from overlapping, the additional disclosure of the present specification suggest that the MTC device operate as follows.

Mode 3-1

According to mode 3-1, when a PDSCH transmitting PRB region and EPDCCH_monitoring_PRB (PRB region forming an EPDCCH PRB set(s)) overlap in a PDSCH-scheduled subframe, it is assumed that the PDSCH is transmitted through a PDSCH transmitting region scheduled for the MTC device.

RE (or PRB) resources for transmitting EPDCCH, which are overlapped with those for a PDSCH are punctured or rate-matched.

Mode 3-2

According to mode 3-2, when a PDSCH transmitting PRB region and EPDCCH_monitoring_PRB (PRB region forming an EPDCCH PRB set(s)) overlap in a PDSCH-scheduled subframe, it is assumed that the PDSCH is transmitted through a PDSCH transmitting region scheduled for the MTC device.

The MTC device may assume that no EPDCCH is transmitted in an EPDCCH candidate overlapping with a PDSCH RE (or PRB) resource.

Mode 3-3

According to mode 3-3, when a PDSCH transmitting PRB region and EPDCCH_monitoring_PRB (PRB region forming an EPDCCH PRB set(s)) overlap in a PDSCH-scheduled subframe, it is assumed that a PDSCH is transmitted via puncturing or rate-matching in an RE (or PRB) region overlapping with a transmission region for an EPDCCH received (successfully decoded) by the MTC device.

Mode 3-4

According to mode 3-4, when a PDSCH transmitting PRB region and EPDCCH_monitoring_PRB (PRB region forming an EPDCCH PRB set(s)) overlap in a PDSCH-scheduled subframe, the MTC device assumes that a PDSCH s transmitted via puncturing or rate-matching in a PRB region overlapping with EPDCCH_monitoring_PRB.

Mode 3-5

According to mode 3-5, the MTC device does not perform EPDCCH monitoring in a PDSCH-scheduled subframe.

That is, the MTC device may assume that no EPDCCH is transmitted in the PDSCH-scheduled subframe.

Mode 3-6

According to mode 3-6, when a PDSCH transmitting PRB region and EPDCCH_monitoring_PRB (PRB region forming an EPDCCH PRB set(s)) overlap in a PDSCH-scheduled subframe, the MTC device does not perform EPDCCH monitoring.

Mode 3-7

According to mode 3-7, the MTC device assumes that a PDSCH is transmitted through a PDSCH transmitting region scheduled for the MTC device.

When a PDSCH transmitting PRB region overlaps with a PRB region of a specific EPDCCH PRB set, it is assumed that no EPDCCH is transmitted in the EPDCCH PRB set (no EPDCCH monitoring is performed in the EPDCCH PRB set).

<Another Additional Disclosure of the Present Specification—EPDCCH Candidates>

Meanwhile, according to 3GPP TS 36.213, the number of EPDCCH candidates to be monitored by the MTC device may be determined based on an aggregation level, the number of PRBs (that is, the number of PRB pairs) in an EPDCCH PRB set, an EPDCCH transmission mode (a localized EPDCCH transmission mode or a distributed EPDCCH transmission mode), and any one of case 1, case 2 and case 3. Here, case 1, case 2, and case 3 are determined based on a used DCI format or on whether a used CP is a normal CP or extended CP.

Case 1 to case 3 may apply as follows.

Case 1 applies as below.

1. For normal subframes and a normal downlink cyclic prefix (CP) when DCI formats 2/2A/2B/2C/2D are monitored and $\hat{N}_{RB}^{DL} \geq 25$.

2. For special subframes with special subframe configurations 3, 4, and 8 and a normal downlink CP when DCI formats 2/2A/2B/2C/2D are monitored.

3. For normal subframes and a normal downlink CP when DCI formats 1A/1B/1D/1/2/2A/2B/2C/2D/0/4 are monitored and $n_{EPDCCH} < 104$.

4. For special subframes with special subframe configurations 3, 4, and 8, a normal downlink CP when DCI formats 1A/1B/1D/1/2A/2/2B/2C/2D/0/4 are monitored, and $n_{EPDCCH} < 104$.

Here, $n_{EPDCCH}$ denotes the number of downlink REs in a PRB pair configured for possible EPDCCH transmission of an EPDCCH set.

Case 2 applies as below.

1. For normal subframes and an extended downlink CP when DCI formats 1A/1B/1D/1/2A/2/2B/2C/2D/0/4 are monitored.

2. For special subframes with special subframe configurations 1, 2, 6, 7, and 9 and a normal downlink CP when DCI formats 1A/1B/1D/1/2A/2/2B/2C/2D/0/4 are monitored.

3. For special subframes with special subframe configurations 1, 2, 3, 5, and 6 and an extended downlink CP when DCI formats 1A/1B/1D/1/2A/2/2B/2C/2D/0/4 are monitored.

Case 3 applies in other cases.

According to the above details and 3GPP TS 36.213, an aggregation level for constructing an EPDCCH PRB set and the number of EPDCCH candidates by the aggregation level (AL) may change depending on case 1, case 2, and case 3, and a case which each cell belongs to is associated with $N_{RB}^{DL}$ ($\hat{N}_{RB}^{DL} = N_{RB}^{DL}$ of the serving cell on which EPDCCH is monitored).

This is because the size of a resource allocation (RA) field of DCI changes depending on $N_{RB}^{DL}$ (downlink system bandwidth) and accordingly the number of ECCEs forming the DCI needs to change.

Meanwhile, it is considered for the low-cost MTC device to use a downlink channel bandwidth of 1.4 MHz for a data channel.

Thus, although a PDCCH is transmitted via the entire downlink system bandwidth (for example, 10 MHz or 50 RBs), a PDSCH may be transmitted via the maximum PDSCH bandwidth (for example, 6 RBs).

In this case, the size of DCI transmitted to the low-cost MTC device may change depending on a restricted PDSCH bandwidth (Max_PDSCH_BW), not on the downlink system bandwidth.

Therefore, according to the other additional disclosure of the present specification, when DCI is transmitted to the low-cost MTC device via an EPDCCH, $\hat{N}_{RB}^{DL}$ denotes Max_PDSCH_BW (that is, the size of the maximum PRB region for transmitting data (PDSCH)).

Alternatively, according to the other additional disclosure of the present specification, case 3 (or case 2) having a large number of EPDCCH candidates with a small aggregation level is always applied for the low-cost MTC device that may have a restricted size of PRBs for transmitting an EPDCCH.

The aforementioned details may be applied not only to an MTC device that needs coverage extension but also to an MTC device not needing coverage extension (for example, an MTC device that performs 0 dB coverage enhancement), a low-cost MTC device, or a low-complexity MTC device.

The aforementioned embodiments of the present invention can be implemented through various means. For example, the embodiments of the present invention can be implemented in hardware, firmware, software, combinations thereof, etc. Details thereof will be described with reference to the drawing.

Figure 14:
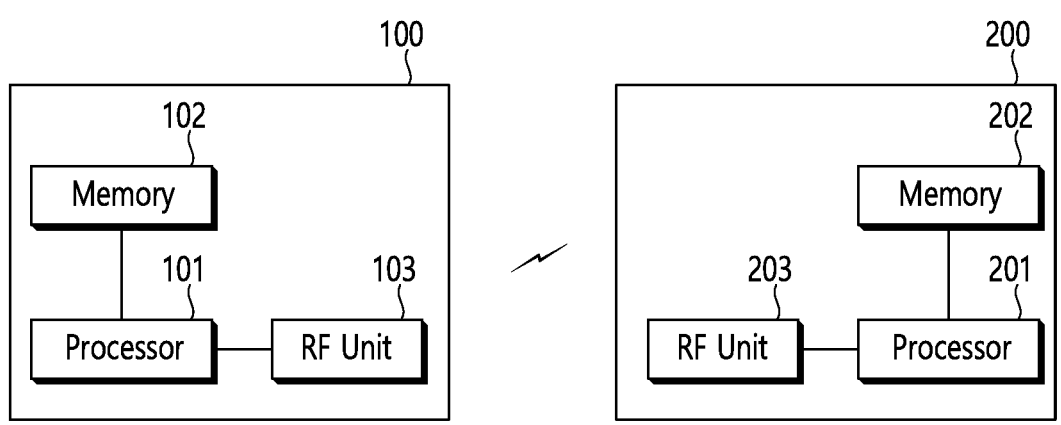
FIG. 14 is a block diagram illustrating a wireless communication system according to the disclosure of the present specification.

FIG. 14 is a block diagram of a wireless communication system according to a disclosure of the present specification.

A BS 200 includes a processor 201, a memory 202, and a radio frequency (RF) unit 203. The memory 202 is coupled to the processor 201, and stores various pieces of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device 100 includes a processor 101, a memory 102, and an RF unit 103. The memory 102 is coupled to the processor 101, and stores various pieces of information for driving the processor 101. The RF unit 103 is coupled to the processor 101, and transmits and/or receives a radio signal. The processor 101 implements the proposed functions, procedures, and/or methods.

The processors may include application-specific integrated circuits (ASICs), other chipsets, logic circuits, and/or data processors. The memory may include read-only memory (ROM), random access memory (RAM), flash memory, memory cards, storage media and/or other storage devices. The RF units may include a baseband circuit for processing a radio signal. When an embodiment is implemented in software, the above-described schemes may be implemented using a module (process or function) which performs the above function. The module may be stored in the memories and executed by the processors. The memories may be disposed to the processors internally or externally and connected to the processors using a variety of well-known means.

A UE according to one disclosure of the present specification, which is an MTC device for receiving a downlink control channel, includes a radio frequency (RF) unit to receive configuration information on a maximum number of PRBs which are available for a base station to transmit the downlink control channel and configuration information on a set of PRBs for monitoring control channel in which the MTC device needs to monitor the downlink control channel; and a processor to monitor the downlink control channel on the PRBs according to the configuration information on the set of PRBs for monitoring control channel, wherein when a number of the PRBs based on the set of PRBs for monitoring control channel exceeds the maximum number of PRBs, the processor may monitor the downlink control channel only on a set of a number of PRBs equal to or less than the maximum number of PRBs.

Here, the maximum number of PRBs for the downlink control channel may be 6.

Further, the processor may monitor the downlink control channel only on a set of a number of PRBs having a relatively low PRB index, equal to or less than the maximum number of PRBs, in the set of PRBs for monitoring control channel.

Further, the processor may assume that PRBs in which the downlink control channel is not monitored in the set of PRBs for monitoring control channel are punctured or rate-matched.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving physical downlink channels, the method performed by a device and comprising:
   performing blind decoding of downlink control information (DCI) via a first downlink control channel in a first subframe, which is received from a cell,
   wherein the DCI includes scheduling information for a physical downlink shared channel (PDSCH),
   receiving, from the cell, downlink data via the PDSCH in a second subframe based on the scheduling information,
   wherein a second downlink control channel is assumed to be not transmitted in the second subframe from the cell, based on the downlink data being received in the second subframe.

2. The method of claim 1, wherein bandwidth for the first downlink control channel and bandwidth for the PDSCH are configured independent of each other.

3. The method of claim 1, wherein bandwidth for the first downlink control channel and bandwidth for the PDSCH include a maximum of 6 physical resource blocks (PRBs).

4. The method of claim 1, wherein the DCI in the first downlink control channel includes a resource allocation (RA) field which is expressed in units of 6 PRBs.

5. The method of claim 1, wherein the scheduling information for the PDSCH is related to cross subframe scheduling such that the second subframe in which the downlink data is received via the PDSCH is later than the first subframe in which the downlink data is received via the first downlink control channel.

6. A device for receiving physical downlink channels, the device and comprising:
   a transceiver; and
   a processor which controls the transceiver and performs:
   performing blind decoding of downlink control information (DCI) via a first downlink control channel in a first subframe, which is received from a cell,
   wherein the DCI includes scheduling information for a physical downlink shared channel (PDSCH),
   receiving, from the cell, downlink data via the PDSCH in a second subframe based on the scheduling information,
   wherein a second downlink control channel is assumed to be not transmitted in the second subframe from the cell, based on the downlink data being received in the second subframe.

7. The device of claim 6, wherein bandwidth for the first downlink control channel and bandwidth for the PDSCH are configured independent of each other.

8. The device of claim 6, wherein bandwidth for the first downlink control channel and bandwidth for the PDSCH include a maximum of 6 physical resource blocks (PRBs).

9. The device of claim 6, wherein the DCI in the first downlink control channel includes a resource allocation (RA) field which is expressed in units of 6 PRBs.

10. The method of claim 6, wherein the scheduling information for the PDSCH is related to cross subframe scheduling such that the second subframe in which the downlink data is received via the PDSCH is later than the first subframe in which the downlink data is received via the first downlink control channel.

* * * * *